(12) United States Patent
Maier et al.

(10) Patent No.: US 12,183,233 B2
(45) Date of Patent: Dec. 31, 2024

(54) DISPLAY APPARATUS

(71) Applicant: TriLite Technologies GmbH, Vienna (AT)

(72) Inventors: Franz Josef Maier, Poertschach am Woerthersee (AT); Manuel Dorfmeister, Wiesen (AT); Joerg Reitterer, Brunn am Gebirge (AT); Louahab Noui, East Sussex (GB)

(73) Assignee: TriLite Technologies GmbH, Vienna (AT)

( * ) Notice: Subject to any disclaimer, the term of this patent is extended or adjusted under 35 U.S.C. 154(b) by 209 days.

(21) Appl. No.: 17/955,004

(22) Filed: Sep. 28, 2022

(65) Prior Publication Data

US 2023/0110763 A1 Apr. 13, 2023

(30) Foreign Application Priority Data

Oct. 13, 2021 (EP) .................................... 21202486
Dec. 22, 2021 (EP) .................................... 21216944
Jun. 20, 2022 (EP) .................................... 22179925

(51) Int. Cl.
*G09G 3/02* (2006.01)
*G02B 26/08* (2006.01)
(Continued)

(52) U.S. Cl.
CPC ............. *G09G 3/02* (2013.01); *G02B 26/085* (2013.01); *G02B 26/105* (2013.01); *G02B 27/0172* (2013.01); *G02B 27/0179* (2013.01); *G06F 3/012* (2013.01); *G06F 3/013* (2013.01); *G06T 15/005* (2013.01); *G06T 19/006* (2013.01); *G02B 2027/014* (2013.01); *G02B 2027/0178* (2013.01); *G02B 2027/0187* (2013.01);
(Continued)

(58) Field of Classification Search
CPC ...... G09G 3/02; G02B 26/085; G02B 26/105; G02B 27/0172; G02B 27/0179; G02B 2027/0178; G02B 2027/0187; G06F 3/012; G06F 3/013; G06T 15/005; G06T 19/006
See application file for complete search history.

(56) References Cited

U.S. PATENT DOCUMENTS 9,986,215 B1 5/2018 Tardif et al.
11,699,371 B2 * 7/2023 Maier ................ G02B 27/0093
345/156

(Continued)

OTHER PUBLICATIONS

European Search Report corresponding to Application No. 22179925.7-1020, dated Dec. 21, 2022.
(Continued)

*Primary Examiner* — Antonio A Caschera
(74) *Attorney, Agent, or Firm* — Hoffmann & Baron, LLP

(57) ABSTRACT

An apparatus for displaying a virtual scene comprises a display wearable on a user's head and a graphics controller configured to calculate, from scene data representing the virtual scene, image data for the display such that the virtual scene is displayed in the environment irrespective of the head's position and pointing direction, the virtual scene appearing in the image data in a region of scene, wherein the graphics controller is configured to modulate excitation signals of a Lissajous scanning mirror assembly, which diverts the light beam of a light source, by modulation signals which are dependent on the region of scene.

15 Claims, 8 Drawing Sheets

(51) Int. Cl.
    *G02B 26/10*     (2006.01)
    *G02B 27/01*     (2006.01)
    *G06F 3/01*     (2006.01)
    *G06T 15/00*     (2011.01)
    *G06T 19/00*     (2011.01)

(52) U.S. Cl.
    CPC ............... *G09G 2320/0233* (2013.01); *G09G 2320/0247* (2013.01); *G09G 2340/0407* (2013.01); *G09G 2354/00* (2013.01); *G09G 2360/18* (2013.01)

(56) References Cited

U.S. PATENT DOCUMENTS

| | | |
|---|---|---|
| 11,830,396 B2 * | 11/2023 | Maier ................ G02B 27/0172 |
| 2013/0222774 A1 | 8/2013 | Chikaoka |
| 2016/0328884 A1 | 11/2016 | Schowengerdt et al. |
| 2017/0188021 A1 | 6/2017 | Lo et al. |
| 2018/0252913 A1 | 9/2018 | Tardif et al. |
| 2019/0279546 A1 | 9/2019 | Peuhkurinen et al. |

OTHER PUBLICATIONS

European Patent Office Search Report on Application No. 21202486.3, dated Mar. 18, 2022.
European Patent Office Search Report on Application No. 21216944.5, dated Jun. 10, 2022.

\* cited by examiner

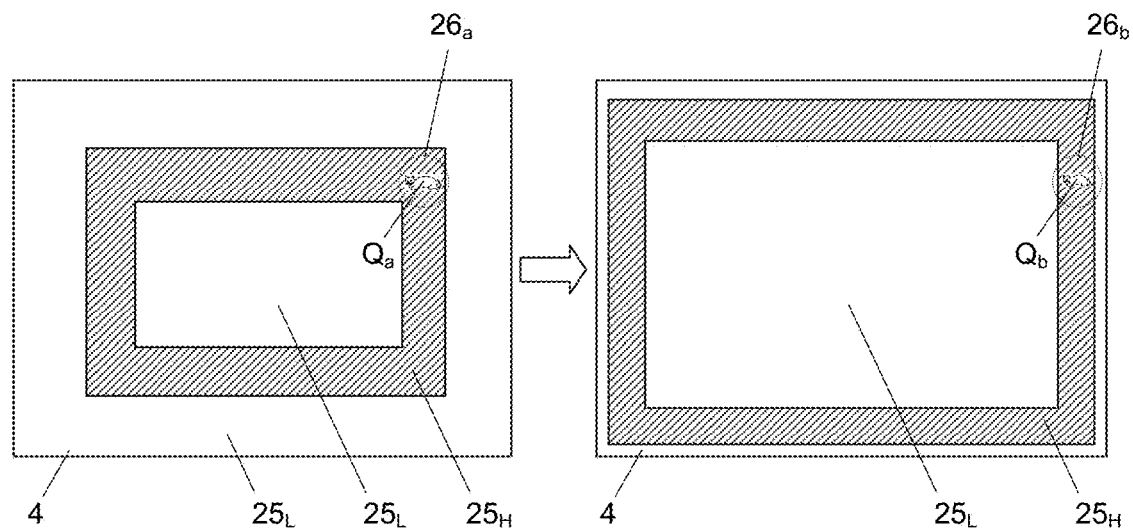
*Fig. 10A*  *Fig. 10B*
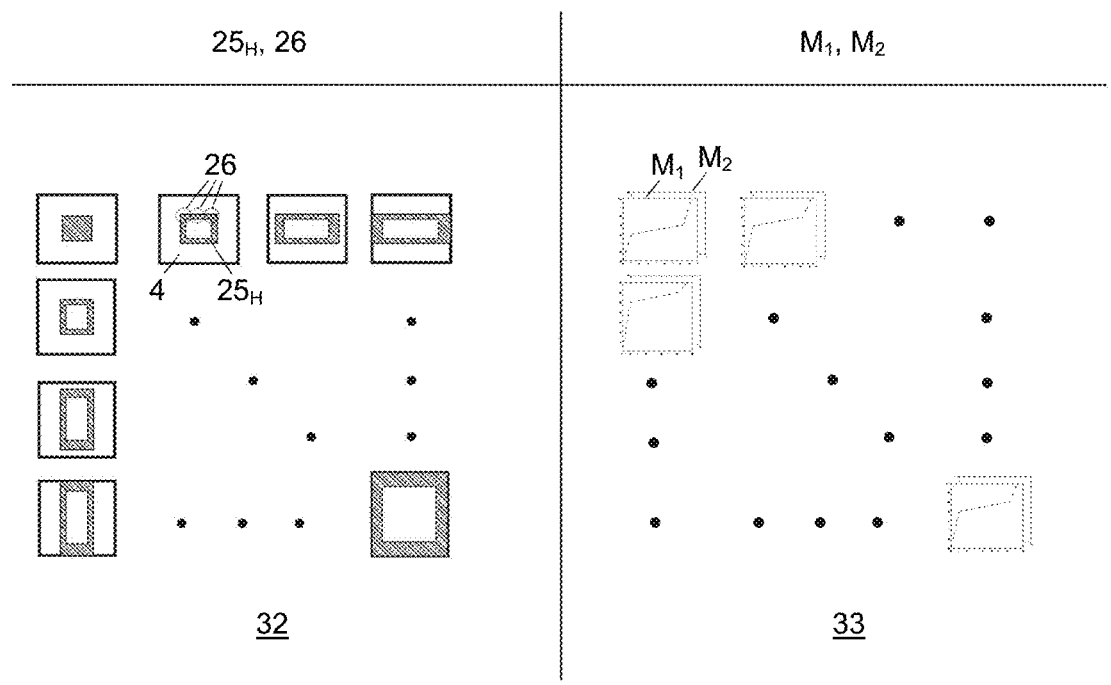
*Fig. 11*

DISPLAY APPARATUS

CROSS-REFERENCE TO RELATED APPLICATIONS

This application claims priority to the European Patent Applications No. 21 202 486.3 filed Oct. 13, 2021 and No. 21 216 944.5 filed Dec. 22, 2021 and No. 22 179 925.7 filed Jun. 20, 2022, the disclosures of which are incorporated herein by reference.

TECHNICAL FIELD

The present disclosed subject matter relates to an apparatus for displaying a virtual scene at a selected position in an environment to a user who has a varying head position and head pointing direction in the environment, comprising a display wearable on the head in front of an eye and configured to display and concurrently combine an image on an image plane with light from the environment, a head tracker configured to detect the varying head position and head pointing direction in the environment, and a graphics controller connected to the head tracker and the display and having an input for scene data representing the virtual scene at the selected position, the graphics controller being configured to calculate, from the scene data, image data for the display such that the virtual scene is displayed to the eye at the selected position in the environment irrespective of the varying head position and head pointing direction, wherein the image data is a succession of image frames to be displayed on the image plane with a frame rate, each image frame being composed of pixels and being displayed for a frame period, and the virtual scene appearing in each image frame in a region of scene, ROS.

BACKGROUND

Apparatus of this kind are used in augmented reality (AR) glasses or helmets for a broad range of applications like navigation, training, entertainment, education or work. The virtual scene to be displayed may be any piece of information that shall be displayed stationarily to the user in an environment in which the user moves around or turns his or her head, such as digital signage, virtual objects or characters, actors of a movie scene etc. The selected position at which the virtual scene shall be displayed may change over time, and the virtual scene itself can be either static or dynamic, e.g., a spinning, circulating or reciprocating advertising pillar, a gesticulating or walking actor or actress, a CGI (computer generated imagery) object or character, or the like.

In such apparatus, a light source may emit a mono- or multicoloured light beam carrying an image comprised of pixels onto a moving micro-electro-mechanical-system (MEMS) mirror which deflects the light beam into subsequent directions (angles), one direction (angle) per pixel of the image. In raster scanning, the mirror oscillates fast about a vertical axis and slowly about a horizontal axis to sweep the directions and, thus, scan the light beam over the pixels of the image plane row by row and line by line. For the fast axis oscillation, the mirror can be driven in resonance with the natural harmonics of its articulation. However, for the slow sweep about its other axis the mirror needs to be forcedly driven against its resonance frequency, which either requires more power and a larger drive system or limits the scanning speed and hence the frame rate of the display.

To overcome these miniaturisation and speed limits of raster scanning, in so-called Lissajous scanning the mirror oscillates resonantly—or near resonance—about both axes. The frequencies of oscillation about the two axes are greater than the frame rate and the beginnings of their respective oscillation periods usually meet only every one or more frames. In this way, each frame (image) is "painted" with a very complex, "dense" Lissajous trajectory.

With Lissajous scanning, higher speeds of the light beam along its Lissajous trajectory and hence higher frame rates can be achieved with low driving powers and small actuators because of exploiting the resonance of the MEMS mirror. However, Lissajous scanners suffer from an uneven pixel resolution over the image for two reasons. Firstly, due to the sinusoidal oscillation of the mirror about each of its two axes the light beam moves fast in the middle and slowly at the periphery of the image plane. Secondly, due to the non-uniform pattern or "distribution" of the Lissajous trajectory of the light beam across the image plane each unit area of the image plane may be passed by the light beam once, twice or more per image frame. These effects usually lead to a high local density of the trajectory in the periphery of the image plane and a low local density of the trajectory in the middle. The lowest local density of the trajectory in the entire image, however, generally limits the pixel resolution of the display, as at least one light beam pass per pixel area is necessary to display a pixel of the image.

BRIEF SUMMARY

It is an object of the disclosed subject matter to provide a display apparatus with increased pixel resolution.

This object is achieved with a display apparatus of the aforementioned type, which is distinguished in that the display includes a mirror assembly connected to the graphics controller, a first mirror of the mirror assembly being configured to oscillate about a first axis upon excitation by a first excitation signal of a first frequency and the first or a second mirror of the mirror assembly being configured to oscillate about a second axis upon excitation by a second excitation signal of a second frequency, wherein the display further includes a light source configured to project a light beam onto the mirror assembly for deflection by the mirror assembly towards the image plane, each pixel in the image plane being hit by the light beam with a per-pixel refresh rate, the light source having an input via which it can be controlled according to the pixels of the image data, the image data being fed from the graphics controller to the display via a buffer and an image processor which selectively reads-out the pixels from the buffer and then sequentially applies them to the input of the light source, wherein the graphics controller is configured to modulate one of the first and second excitation signals by a first modulation signal which is dependent on the ROS.

By modulating (at least) one of the excitation signals of the oscillating (at least one) mirror the shape of the Lissajous trajectory drawn by the light beam on the image plane is changed over time which, in turn, changes the local density of the beam trajectory. In this way, either the number of times a certain pixel in the image plane is hit by the light beam within a specific time period, i.e., the per-pixel refresh rate, can be changed, and/or the number of (differing) passes each unit area of the image plane is hit by the light beam within a specific time period can be changed, which can then be used to change the local pixel resolution. This, in turn, can be used to display the virtual scene with an increased refresh rate and/or resolution as compared to conventional Lissajous scanning AR displays which are limited to the lowest local density of the Lissajous trajectory in the entire image.

In a first embodiment, the ROS-dependent modulation of the Lissajous scanning mirror assembly is used to increase the refresh rate of the virtual scene by choosing the dependency of the first modulation signal on the ROS such that the per-pixel refresh rate is higher in the ROS than in a region outside of the ROS. The display apparatus then automatically shifts the best per-pixel refresh rate available in the image plane to the ROS determined by the graphics controller. In this way, an optimised display with minimal perceived flickering can be achieved, regardless of where the user currently looks to in the environment, even if the user looks aside the virtual scene and perceives the virtual scene only in the periphery of his or her visual field. The peripheral rods of the human retina are more trigger sensitive than the cones responsible for colour perception in the fovea, so that flickering of the virtual scene would be particularly annoying when the user does not look straight onto it. The inventive display apparatus allows for a flicker-free AR display without the need to increase the oscillation frequencies of the mirror or the overall frame rate of the display.

The transition from the ROS of high pixel resolution to any neighbouring region of low pixel resolution can optionally be "smoothed" by interposing at least one intermediate region with an intermediate pixel resolution. To this end, according to an optional variant the graphics controller is configured such that the per-pixel refresh rate is, in an intermediate region between the ROS and a region outside of the ROS, lower than in the ROS and higher than in said region outside. In particular, several adjacent intermediate regions of gradually decreasing pixel resolutions may be used, to better smooth the transition.

In a second embodiment, the ROS-dependent modulation of the Lissajous scanning mirror assembly is used to increase the local pixel resolution of the virtual scene by chosing the dependency of the first modulation signal on the ROS such that the number of passes of the light beam per unit area of the image plane and per frame period is higher in the ROS than in a region outside of the ROS, and by controlling the number of pixels read-out per unit area and per frame period such that said number of pixels is higher in the ROS than in a region outside of the ROS.

In this way, the inventive display apparatus displays the virtual scene in the ROS with a pixel resolution as high as the regions of high local density of the beam trajectory allow. Image areas outside of the ROS may stay at a lower resolution corresponding to regions of low local density of the beam trajectory. The display apparatus thus automatically shifts the best pixel resolution available in the image plane to the ROS determined by the graphics controller. An optimised display with high perceived pixel resolution is the result, without the need to increase the oscillation frequencies of the mirror.

Also in this second embodiment the transition from the ROS of high pixel resolution to any neighbouring region of low pixel resolution can optionally be "smoothed" by interposing at least one intermediate region with an intermediate pixel resolution. To this end, according to an optional further variant the graphics controller is configured such that the number of passes is, in an intermediate region between the ROS and a region outside of the ROS, lower than in the ROS and higher than in said region outside, and the image processor is configured such that the number of pixels read-out is, in said intermediate region, lower than in the ROS and higher than in said region outside. In particular, several adjacent intermediate regions of gradually decreasing numbers of light beam passes and numbers of read-out pixels may be used, to better smooth the transition.

In an optional variant of the second embodiment, the image processor is configured to receive a control signal from the graphics controller, which control signal indicates a pixel read-out ratio to be used by the image processor when reading-out the pixels. This allows for a fast, straightforward implementation of the image processor.

The head tracker can be of any type known in the art as long as it is able to detect the—usually varying—head position and pointing direction of the user's head. For example, the head tracker could be a camera mounted in the environment looking at the user and analysing his or her head's position and pointing direction by image processing within a 2D or 3D image of the user in the environment. Or, the head tracker could be fixed in the environment and detect the user's head position and pointing direction by wireless triangulation of radio waves or visible or infrared light rays reflected from the user's head or a reflective target worn on the head or emitted from a device worn by the user on the head.

In a further embodiment the head tracker is worn by the user on the head, and the head tracker detects the user's head position and pointing direction by analysing its own position and pointing direction in the environment, e.g. by image processing of an image of the environment or by wireless signals reflected from the environment or transmitted from radio, light or infrared beacons in the environment. To this end in a first variant the head tracker is mounted on the display and has a camera for capturing a 3D segment of the environment from the current head position and in the current head pointing direction, and the graphics controller has a memory containing a 3D model of the environment and is configured to detect the current head position and current head pointing direction from a comparison of the 3D segment with the 3D model. In this way the apparatus can be self-contained and the environment does not need to be modified or equipped with external devices.

Alternatively, in a second variant the head tracker is mounted on the display and has a receiver for radio signals from known locations in the environment as well as an accelerometer for dead reckoning, and the graphics controller is configured to detect the current head position and current head pointing direction by means of the receiver and the accelerometer. The radio signals may, e.g., be satellite signals from a global navigation satellite system (GNSS) such as GPS, GLONASS, LEO etc., and the accelerometer (inertial measurement unit, IMU) can be used to improve the accuracy of the GNSS localisation. Or, the radio signals originate from dedicated radio beacons, e.g. WLAN or Bluetooth transmitters, distributed in the environment.

Regions of increased per-pixel refresh rate and/or increased pixel resolution may be accompanied by an unwanted increase in light intensity, which may lead to an unevenly lit image. To counter this effect, in a further embodiment the graphics controller is configured to decrease the intensity of the light beam for a pixel in the ROS when the amount of time the light beam spends in that pixel during an image frame increases, and vice versa.

Of course, all what has been said so far for modulating one of the two mirror excitation signals can be applied in much the same way for modulating both of the two excitation signals, each one with a separate modulation signal. Generally speaking, the graphics controller may be configured to modulate the other one of the first and second excitation signals by a second modulation signal which is dependent on the location of the ROS.

All embodiments and variants detailed above for the modulation of the one excitation signal also apply to the modulation of the other excitation signal by the second modulation signal. In particular, the dependency of the second modulation signal on the ROS may be such that the per-pixel refresh rate is higher in the ROS than in a region outside of the ROS, or the dependency of the second modulation signal on the ROS may be such that the number of passes of the light beam per unit area of the image plane and per frame period is higher in the ROS than in a region outside of the ROS, while the image processor is configured to control the number of pixels read-out per unit area and per frame period such that said number of pixels is higher in the ROS than in a region outside of the ROS.

In order to keep the region of increased per-pixel refresh rate or increased pixel resolution by modulating the excitation signal/s stable over successive image frames of a series of image frames, the frequency of the first and/or second modulation signal/s is optionally a one- or morefold of the frame rate.

The excitation signal/s can be modulated in different ways, e.g., by amplitude, frequency, phase or pulsewidth modulation. For example, using a frequency modulation which periodically detunes the respective excitation signal from the resonance frequency of the mirror around the respective axis also periodically alters the amplitude of the mirror oscillation because of deviating from the case of resonance. In a further embodiment of the disclosed subject matter an amplitude modulation is used to directly manipulate the amplitude of the excitation signal/s.

The dependency of the modulation signal/s on the ROS can be given by an analytical formula programmed into the graphics controller. However, in a practical implementation the graphics controller has a memory with a look-up table which stores, for each one of a set of different possible ROS within the image plane, at least a respective first modulation signal, optionally also a respective second modulation signal, dependent on that ROS, and the graphics controller is configured to retrieve at least the first modulation signal, optionally both the first and the second modulation signals, dependent on the ROS from the look-up table. A look-up table allows for a fast real-time implementation with low processing needs and the use of pre-stored dependency functions found heuristically or by simulation.

The first and the second excitation signal can be modulated with different modulation signals which are entirely independent of each other and respectively change the region of increased per-pixel refresh rate and/or increased pixel resolution independently in both dimensions across the image plane. Any modulation signal/s for the first and/or second excitation signals which does/do the job of shifting the region of increased per-pixel refresh rate and/or increased pixel resolution into or over the ROS can be used. In a first variant, at least one of the first and second modulation signals is a triangular or saw-tooth signal with an offset, and the slopes of the saw-teeth or triangles and the offset depend on the ROS.

In a second variant, at least one of the first and second modulation signals is a sequence of sine halves with an offset, and the amplitudes of the sine halves and the offset depend on the ROS.

In a third variant, at least one of the first and second modulation signals is a repetition of a step-like function comprised of a first and a last section with high slope, a middle section with low slope, and an offset, and the respective slopes and lengths of the sections and the offset depend on the ROS.

In a fourth variant, at least one of the first and second modulation signals is a repetition of a step function comprised of at least two sections of different respective constant values, and the respective values and lengths of the sections depend on the ROS.

BRIEF DESCRIPTION OF THE DRAWINGS

The disclosed subject matter will now be described by means of exemplary embodiments thereof with reference to the enclosed drawings, in which show:

FIGS. 10A and 10B the influence of the ROS on a region of increased per-pixel refresh rate and/or increased pixel resolution on the image plane according to two different head positions and head pointing directions;

FIG. 11 an exemplary look-up table in the memory of the graphics controller of the display apparatus of FIGS. 1, 3 and 5;

DETAILED DESCRIPTION

Figure 1:
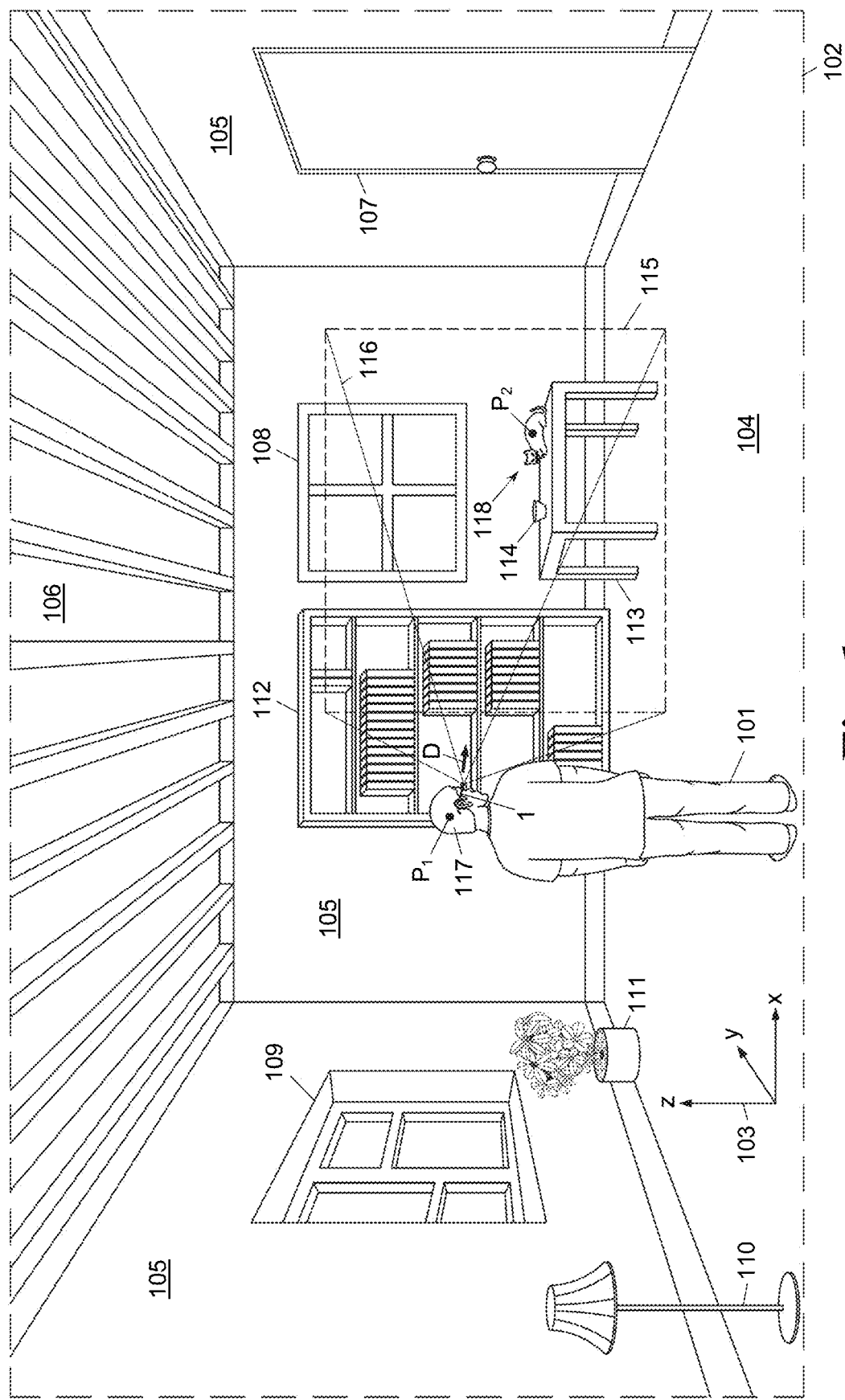
FIG. 1 the display apparatus of the disclosed subject matter built into the pair of AR glasses worn by a user in a domestic environment in a perspective view.

FIG. 1 shows a user 101 in an environment 102 (here: a room) with a coordinate system 103. The environment 102 can be of any kind, e.g., a landscape, a rural or urban outdoor or indoor scene, etc., with real-world objects such as a floor 104, walls 105, a ceiling 106, a door 107, windows 108, 109, a lamp 110, a flower pot 111, a book shelf 112, a table 113, a cup 114, etc.

The user 101 wears a display apparatus 1—or at least the display 1' thereof—in form of AR glasses and perceives a section 115 of the environment 102 in his field of view 116 through the display apparatus 1. The section 115 depends on the current position $P_1$ and pointing direction D of his/her head 117 in the coordinate system 103 of the environment 102.

The display apparatus 1 displays a virtual scene 118 (here: a virtual cat) at a selected, i.e. predetermined or predeterminable, position $P_2$ of the coordinate system 103 in the environment 102, irrespective of where the user 102 is (head position $P_1$) or looks to (head pointing direction D) in the environment 102. This means that the display apparatus 1 is capable of displaying the virtual scene 118 actually at different positions $Q_a$, $Q_b$ within an image plane 4 which the apparatus 1 is able to display in front of an eye 5 of the user 101, see the examples in FIGS. 2A and 2B for two different head pointing directions $D_a$ and $D_b$ from the same head position $P_1$. The virtual scene 118 thus seems to steadily remain at the position $P_2$ regardless of the user's movement.

The virtual scene 118 may be a stationary or dynamic contents and even move around, i.e. the position $P_2$ may change over time, e.g. when the virtual cat strolls around in the environment 102. In general, the virtual scene 118 can be of any type such as 2D or 3D graphics, text or CGI (computer generated imagery) objects, virtual digital signage, a virtual TV set, a virtual actor or actress, an entire virtual movie scene, etc.

The display apparatus 1 will now be explained in detail under reference to FIGS. 3-14d.

Figure 2A:
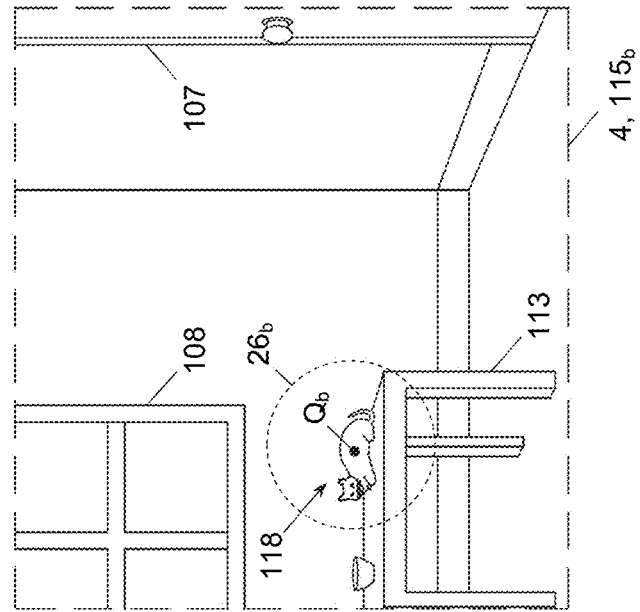
FIGS. 2A and 2B images of the environment as seen by the user in two different head pointing directions through the pair of AR glasses worn by the user in FIG. 1.
Figure 3:
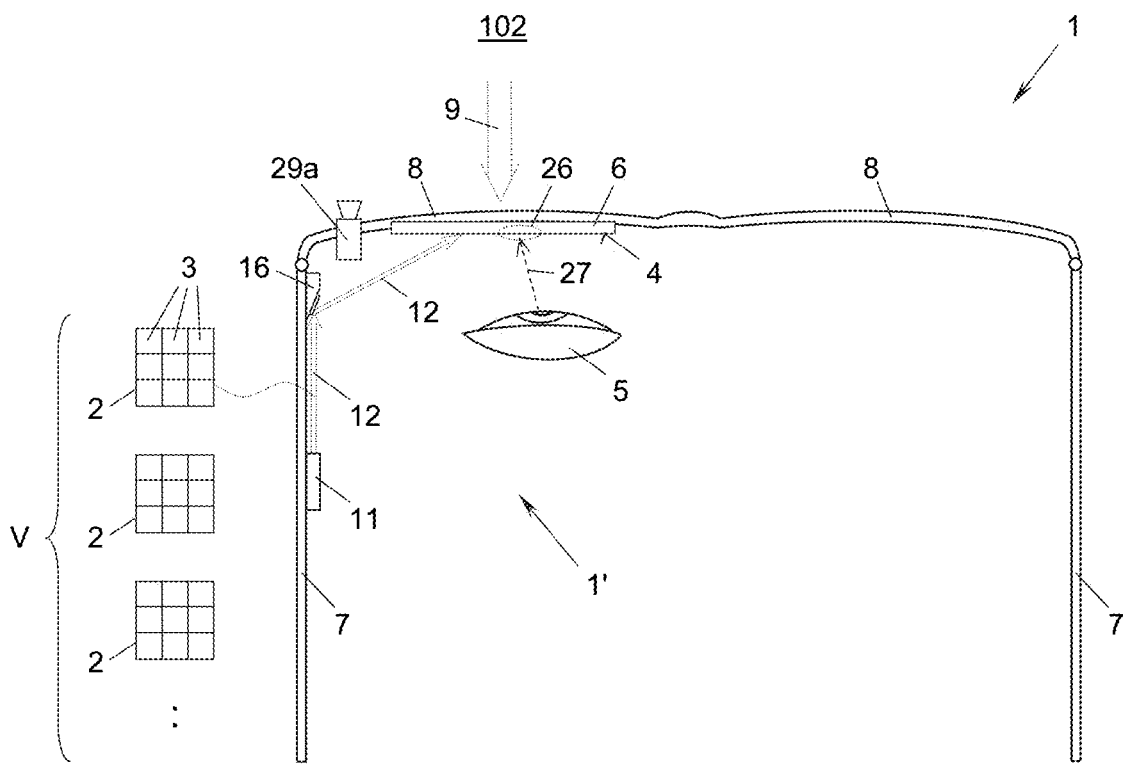
FIG. 3 the display apparatus of FIG. 1 in a schematic top view.
Figure 5:
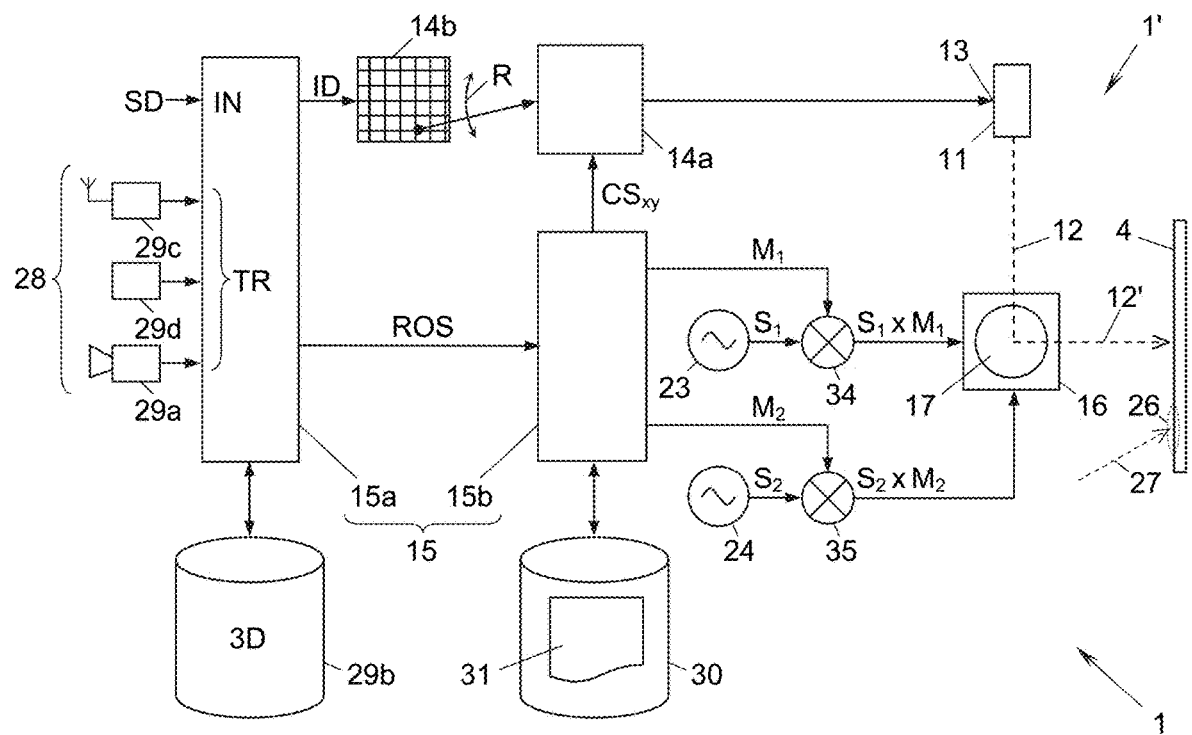
FIG. 5 the display apparatus of FIGS. 1 and 3 in a circuit diagram.

As shown in FIGS. 3 and 5, the display apparatus 1 has an input IN for scene data SD which represents the (static or dynamic) virtual scene 118 and the selected (static or dynamic) position $P_2$. The scene data SD may be delivered to the display apparatus 1 from any source, e.g. a computer, a graphics card, a video player, a video or TV feed, a data, image or video stream over the Internet, etc. As explained later on, a graphics controller 15 within the display apparatus 1 converts the scene data SD and the selected position $P_2$ into image data ID which is then displayed by the display apparatus 1 in the image plane 4. The image data ID contains the virtual scene 118, which is represented by the scene data SD, at the respective position Q (here: $Q_a$ in FIG. 2A and $Q_b$ in FIG. 21B) in the image plane 4.

The image data ID is in form of a series V of successive image frames 2 (also called "images" or "frames" herein) each comprised of pixels 3. Each image frame 2 is projected by the display apparatus 1 towards the image plane 4 in front of the user's eye 5 for a frame period $T_{fr}$. The image frames 2 follow one after another with a frame rate $f_{fr}=1/T_{fr}$ and can convey a static content, i.e., several successive image frames 2 show the same contents (e.g. when the user 101 does not move and the virtual scene 118 is static), or an image contents varying from frame to frame such as in a video sequence, e.g., when the user 101 and/or the virtual scene 118 moves.

Figure 14A:
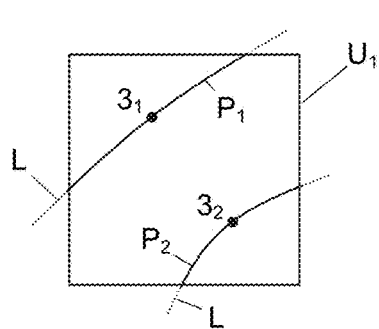
FIGS. 14A and FIG. 14B the passes of the light beam across an exemplary unit area within the image plane during a frame period in a region of low pixel resolution (FIG. 14A) and a region of high pixel resolution (FIG. 14B)
Figure 14B:
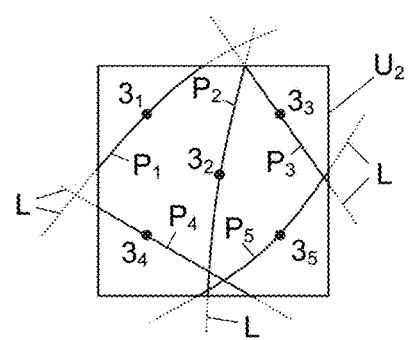
Figure 14C:
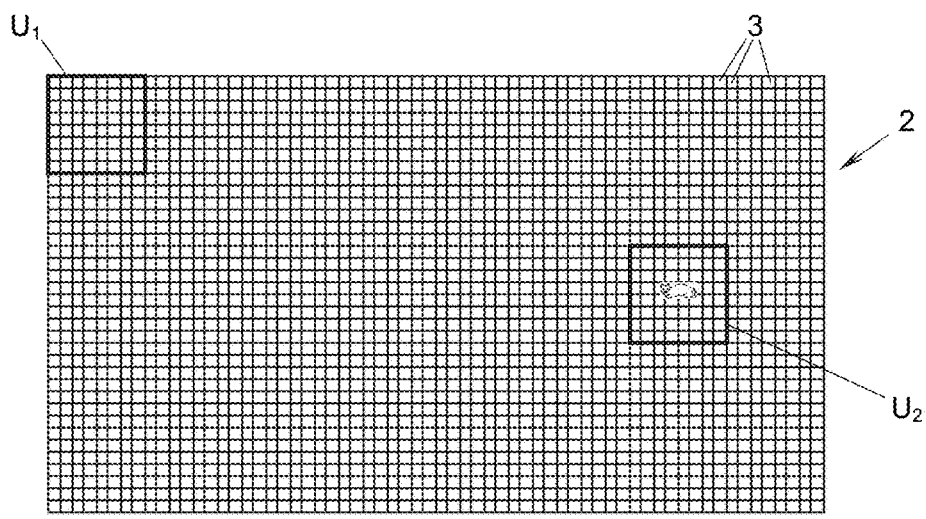
FIG. 14C exemplary image data calculated by the graphics controller for display.
Figure 14D:
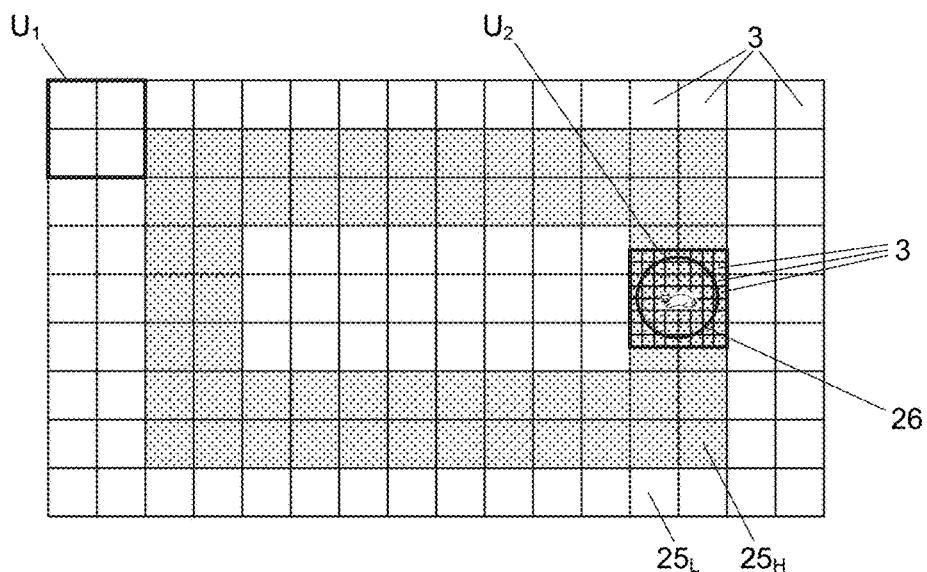
FIG. 14D an exemplary resultant image displayed by the display apparatus of FIGS. 1, 3 and 5 in the image plane.

FIG. 14C is an example of one such image frame 2 of the image data ID calculated in apparatus 1 from the scene data SD. The image frame 2 may have a pixel resolution according to a conventional image or video standard, e.g., full HD (1920×1080 pixels), UHD (3840×2160 pixels), 4K (4096×2160 pixels) etc. As shown in FIG. 14C the pixel resolution of the image frame 2 is usually uniform over the entire area of the image, i.e., the "local" pixel resolution, the number of pixels 3 per unit area U, for example 1 mm$^2$, 1 cm$^2$ or 1 square inch, is the same throughout the entire image frame 2. Two exemplary unit areas in different regions of the image frame 2 are designated in FIG. 14C with $U_1$ and $U_2$.

Reverting to FIG. 3 the image plane 4 is formed by a semi-transparent combiner 6 mounted on augmented reality (AR) glasses comprised of a spectacle frame with a pair of temples 7 and a pair of eye glasses 8. The semi-transparent combiner 6, e.g., a waveguide, a holographic or a freeform combiner, superposes the image frames 2 projected by the display apparatus 1 and containing the virtual scene 118 onto the image plane 4 with a light field 9 from the environment 102 so that the user 101 of the AR glasses can see the image frames 2 or sequence V, respectively, with the virtual scene 118 overlaying ("augmenting") the environment 102.

In the example of FIGS. 1 and 3, the display apparatus 1 (or two such apparatus 1, one per eye glass 8) is built into AR glasses and used in combination with a semi-transparent combiner 6. A similar application of the display apparatus 1 could be in an AR helmet worn by the user 101 or any other head-mounted AR device, which all may use a semi-transparent combiner 6 as the image plane 4. If desired, suitable waveguides, optical systems etc. can be interposed between the display apparatus 1 and the semi-transparent combiner 6.

Instead of the semi-transparent combiner 6 the display apparatus 1 could be used with any other image plane 4, e.g., to directly project the image frames 2 into the user's eye 5, i.e., use the retina of the eye 5 as image plane 4, optionally with suitable optics therebetween. It goes without saying that the image plane 4 can have any form, including a curved form such as the retina of the eye 5.

The display apparatus 1 comprises a light source 11 which emits a light beam 12. The light source 11 can be of any kind including gas lasers, fibre lasers, semiconductor lasers etc. For miniaturisation the light source 11 may employ LEDs, micro LEDs or laser diodes, e.g., edge-emitting laser diodes or surface-emitting laser diodes. For colour pixels 3, the light source 11 may be a polychromatic light source 11, e.g., a set of laser diodes of three primary colours which emit a light beam 12 comprised of three different wavelengths for colour perception.

The light beam 12 carries the image frames 2 in a time-multiplexed manner, i.e., the intensity (luminance) and/or colour values of the pixels 3 one after the other in the sequence the pixels 3 are "painted" on the image plane 4, when the light beam 12 is moved along a trajectory over the image plane 4 as will be explained further on.

With reference to FIG. 5, to control the intensity and/or colour of the light beam 12 pixelwise, the light source 11 has a control input 13 connected to an image processor 14a. The image processor 14a works under the control of the graphics controller 15, as will be explained later on. The image processor 14a receives the image data ID, e.g., the video sequence V of image frames 2 encoded according to a video standard, from the graphics controller 15 via an image buffer 14b and controls the light source 11 according to the intensity and/or colour values of the pixels 3 encoded in the image data ID.

As can be seen from FIGS. 3 and 5, the actual "displaying part" of the display apparatus 1, called the display 1', comprises at least the light source 11, the mirror assembly 16 and (if present) the semi-transparent combiner 6. These is the minimum of components to be worn on the user's head 117, together with the head tracker 28, in case it is head-mounted. The display 1' may, however, optionally comprise one or more other components of the display apparatus 1, but these components could also be arranged in one or more separate devices worn elsewhere, e.g. in a trouser pocket, or put in the environment 102. The electrical connections between the components of the display 1' and all other components of the display apparatus 1 could be either wirebound or wireless, e.g., via any wireless standard such as WiFi, Bluetooth, etc.

As the encoding of the pixels 3 in the image frames 2 is usually different from the order the pixels 3 are drawn by the light beam 12 on the image plane 4, the image processor 14a reads-out ("picks") the respective intensity and/or colour values for each pixel 3 in a random-access manner—schematically shown by arrow R—from the buffer 14b and applies them sequentially, i.e., in the drawing order of the pixels 3 along the light beam's trajectory on the image plane 4, to the input 13 of the light source 11.

To move (scan) the light beam 12 along its a trajectory over the image plane 4, the display apparatus 1 comprises a mirror assembly 16, here: one single micro-electro-mechanical-system (MEMS) mirror, downstream of the light source 11 in the path of the light beam 12. The mirror assembly 16 deflects the light beam 12 into subsequent directions (angles) towards the image plane 4. Optionally, additional optics or waveguides can be interposed in the path of the light beam 12 from the light source 11 via the mirror assembly 16 to the image plane 4.

Figure 4:
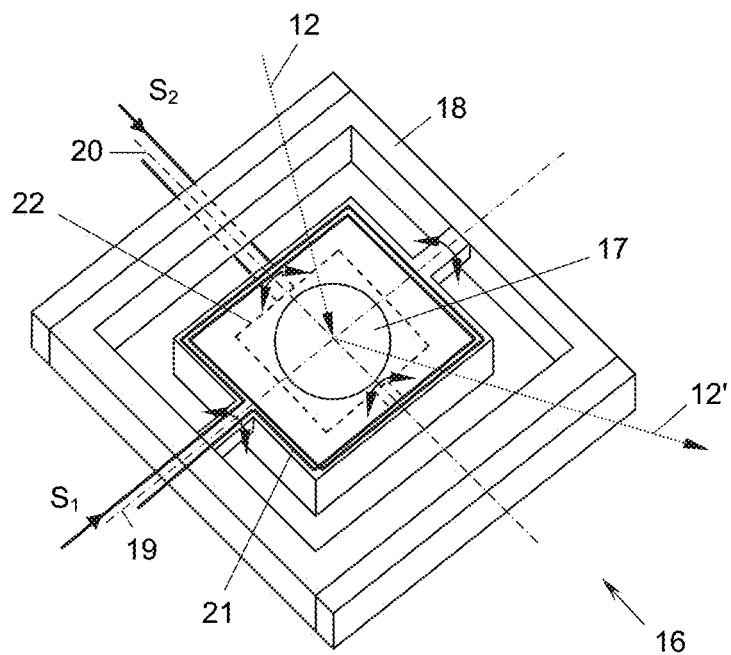
FIG. 4 the MEMS mirror of the display apparatus of FIGS. 1 and 3 in a schematic perspective view.

As shown in FIG. 4, the mirror assembly 16 comprises a mirror 17 pivotably mounted in a support 18 for oscillation about two axes 19, 20. The axes 19, 20 are perpendicular to each other and lie within the plane of the mirror 17 when the mirror 17 is at rest. Other non-perpendicular directions of the two axes 19, 20 could be chosen, as long as they are not perpendicular to the plane of the mirror 17.

To induce the oscillation of the mirror 17 about the first axis 19 a first actuator 21 acts between the mirror 17 and the support 18. The actuator 21 may be a coil attached to the mirror 17 and lying in a magnetic field of the support 18, through which coil a first excitation signal $S_1$ (here: an excitation current) is passed. For inducing the oscillation of the mirror 17 about the second axis 20 a second actuator 22 acts between the mirror 17 and the support 18, e.g., also a coil, through which a second excitation signal $S_2$ is passed. The excitation signals $S_1$, $S_2$ are obtained from signal generators 23, 24 which may be external or internal to the display apparatus 1 and may be a part of the MEMS mirror 16 or the graphics controller 15. Instead of electromagnetic actuators 21, 22 with coils any other type of actuators for driving the oscillations of the mirror 17 about the two axes 19, 20 can be used, e.g., electrostatic, piezoelectric, electrothermal or magnetostrictive actuators.

The frequencies $f_1$ and $f_2$ of the two excitation signals $S_1$ and $S_2$ are chosen such that the mirror 17 oscillates about each axis 19, 20 at—or nearly at—the resonance frequency of the respective articulation of the mirror 17 on the support 18 (or a multiple thereof, e.g., a harmonic frequency of higher order). The resonance frequency or natural harmonics about the respective axis 19, 20 is defined by the mass distribution of the mirror 17 about that axis 19, 20, the spring forces and frictional resistances of the articulations of the mirror 17 about that axis 19, 20, and the magnetic, electrostatic, etc. counterforces of the actuators 21, 22. By oscillating the mirror 17 about the axes 19, 20 at—or in the vicinity of—its resonance frequency about the respective axis 19, 20 a large amplitude of the mirror movement (a large angular sway) can be achieved with small excitation signals $S_1$, $S_2$, i.e., of low power or low amplitude, which allows to use particularly small actuators with small moving masses and high resonance frequencies.

Figure 6A:
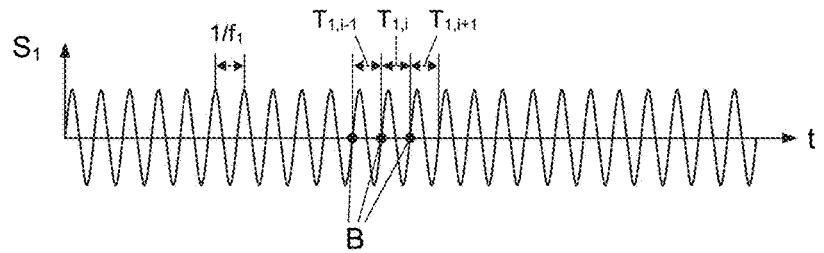
FIGS. 6A and 6B exemplary excitation signals for oscillating the mirror of FIG. 4 about its two axes of articulation.
Figure 6B:
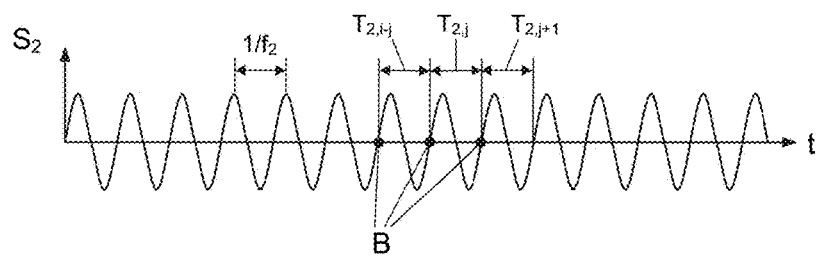

To excite and maintain the resonant oscillations of the mirror 17 about the axes 19, 20 the excitation signals $S_1$, $S_2$ can be of any form, e.g., pulse signals which trigger the mirror oscillations every oscillation period, every other oscillation period or even more seldomly. However, usually the frequencies $f_1$, $f_2$ of the excitation signals $S_1$, $S_2$ will be the same as the oscillation frequencies of the mirror 17 about the axes 19, 20. Most commonly sinusoidal excitation signal $S_1$, $S_2$ will be used, as shown in FIGS. 6A and 6B, but also excitation signals $S_1$, $S_2$ of other shapes are possible, e.g., of rectangular shape.

The frequencies $f_1$ and $f_2$ of the excitation signals $S_1$ and $S_2$ are chosen such that the trajectory of the light beam 12 on the image plane 4 is a Lissajous figure which densely covers the entire image plane 4 during the period $1/f_{fr}$ of one image frame 2. Such a "complex" or "dense" Lissajous figure can be achieved when the frequencies $f_1$, $f_2$ are greater than the frame rate $f_{fr}$, e.g., greater than 1 kHz or tens of kHz, and the beginnings B of their respective oscillation periods $T_i = 1/f_1$, $T_j = 1/f_2$ (i=1, 2, j=1, 2, see FIGS. 6A and 6B) meet, e.g., only over every one or more frames 2, in particular when the frequencies $f_1$, $f_2$ are close to each other. To this end, integer frequencies $f_1$, $f_2$ with a small greatest common divisor, e.g. smaller than 10, may be employed, for example.

Alternatively, instead of the single mirror 17 oscillating about two axes 19, 20, the mirror assembly 16 could comprise two mirrors (not shown) each of which oscillates about a respective one of the (e.g. perpendicular) axes 19, 20 in dependence on the respective excitation signal $S_1$, $S_2$ for successive deflection of the light beam 12. Of course, any of the embodiments described herein may be carried out for this variant as well.

Figure 7A:
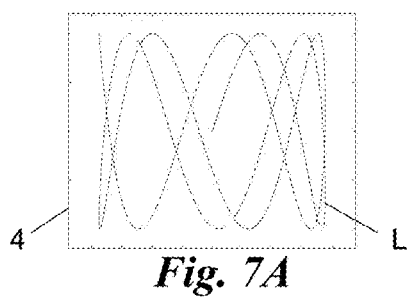
FIGS. 7A-7D four successive stages of the Lissajous trajectory of the light beam of the display apparatus of FIGS. 1, 3 and 5 on the image plane when unmodulated sinusoidal excitation signals such as those of FIGS. 6A and 6B are employed.
Figure 7B:
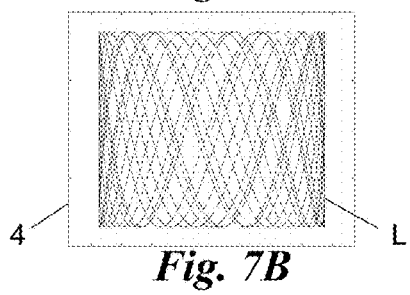
Figure 7C:
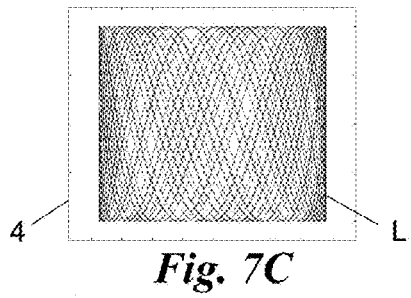
Figure 7D:
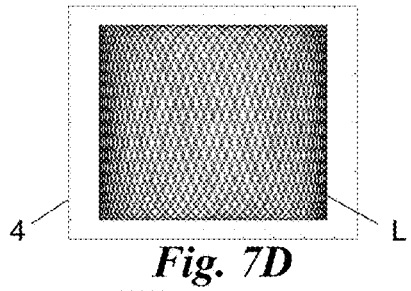
Figure 7E:
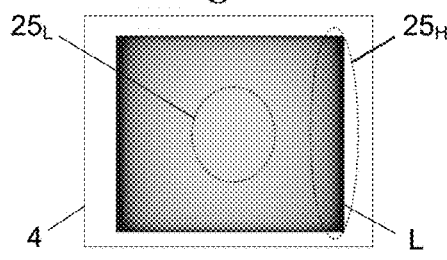
FIG. 7E the distribution of the per-pixel refresh rate over the image plane as a result of the finalised Lissajous trajectory of FIGS. 7A-7D, wherein dark grey represents a high per-pixel refresh rate and light grey represents a low per-pixel refresh rate.

FIGS. 7A-7F show the drawing of a dense Lissajous trajectory L by the light beam 12 on the image plane 4 in successive stages. In the example of FIGS. 7A-7F, $f_1$ was 10003 Hz, $f_2$ was 35000 Hz, the resolution of the image plane 4 was 1152×864 pixels. FIGS. 7A-7D show four initial stages of drawing the Lissajous trajectory L. FIG. 7E shows the resultant "refresh rate" of the laser beam 12 per pixel 3, i.e., how often the laser beam 12 hits a specific pixel 3 during a certain time span of, e.g., 1 second, called the "per-pixel refresh rate" $RR_{xy}$, in greyscale. In FIG. 7E dark grey represents a high per-pixel refresh rate $RR_{xy}$ (e.g., above 80 Hz at the periphery of the image plane 4) and light grey a low per-pixel refresh rate $RR_{xy}$ (e.g., 49 Hz in the middle of the image plane 4).

Figure 8A:
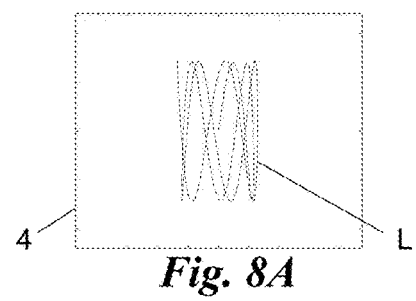
FIGS. 8A-8D four successive stages of the Lissajous trajectory of the light beam of the display apparatus of FIGS. 1, 3 and 5 on the image plane when sinusoidal excitation signals, amplitude-modulated with the modulation signal of FIG. 9, are employed.
Figure 8B:
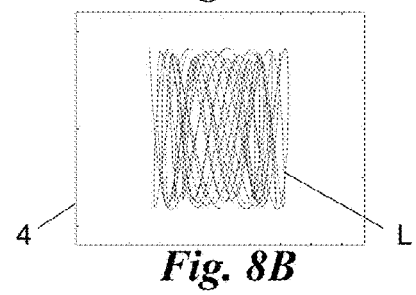
Figure 8C:
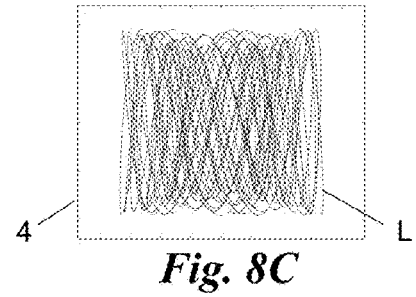
Figure 8D:
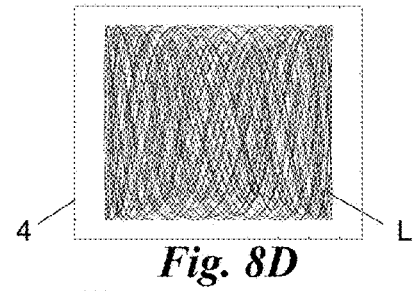
Figure 8E:
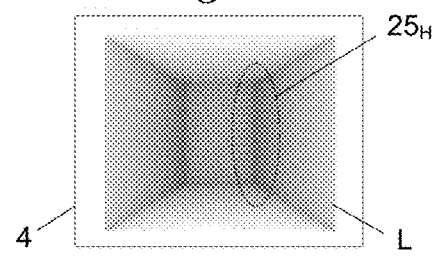
FIG. 8E the distribution of the per-pixel refresh rate over the image plane as a result of the finalised Lissajous trajectory of FIGS. 8A-8D, wherein dark grey represents a high per-pixel refresh rate and light grey represents a low per-pixel refresh rate.

By varying the amplitude of the oscillations of the mirror 17 about the two axes 19, 20 and hence the current maximum size of the trajectory L while it is drawn to "build-up" a frame, as it is shown in FIGS. 8A-8D, the local "density" of the finalised trajectory L on the image plane 4 (FIG. 8E) can be altered in such a way that areas $25_H$ in the image plane 4 with a high per-pixel refresh rate $RR_{xy}$ (FIG. 7E) will occur at different locations in the image plane 4, see FIG. 8E.

FIGS. 7F, 8F, 14A and 14B show—alternatively or additionally to the concept of locally varying the per-pixel refresh rate $RR_{xy}$ as just described with reference to FIGS. 7E and 8E—the concept of locally varying the pixel resolution achieved by the light beam 12 on the image plane 4, i.e., the local number of (geometrically differing) passes of the light beam 12 across a certain local unit area U of the image plane 4 during a certain time span of, e.g., $1/f_{fr}$. Each such different pass can be used to display at least one pixel 3 along the pass.

The local pixel resolution achievable by the number of differing passes of the light beam 12 per unit area U of the image plane 4 and per frame period $T_{fr}$ is depicted in FIGS. 14A and FIG. 14B in more detail. FIG. 14A shows an exemplary unit area $U_1$ of the image plane 4 in a region $25_L$ of low pixel resolution (shown in light grey in FIG. 7F and in white in FIG. 14D) of the image plane 4. In this region $25_L$ the light beam 12 passes the unit area $U_1$ twice in two geometrically differing passes $P_1$, $P_2$ of its trajectory L. Along each pass $P_1$, $P_2$ the light sources 11 can be triggered by the image processor 14a (at least) once to display (at least) one pixel $3_1$, $3_2$ per pass $P_1$, $P_2$, i.e., in the frame period $T_{fr}$ currently considered the local pixel resolution $R_{xy}$ in each unit area U of the region $25_L$ is 2/U. Of course, each pass $P_1$, $P_2$ could also be used to display more than one pixel 3 along its extension by sequentially triggering the laser source 11 with subsequent pixels 3.

In FIG. 14B the light beam 12 passes an exemplary unit area $U_2$ in a region $25_H$ of the high pixel resolution (shown in dark grey in FIG. 7F and in light grey in FIG. 14D) five times, i.e., in five passes $P_1$-$P_5$ along its trajectory L. Each of the passes $P_1$-$P_5$ can be used to display (at least) one pixel $3_1$-$3_5$. In the example of FIG. 14B the local pixel resolution $R_{xy}$ is, in the frame period $T_{fr}$ currently considered, hence 5/U.

Figure 7F:
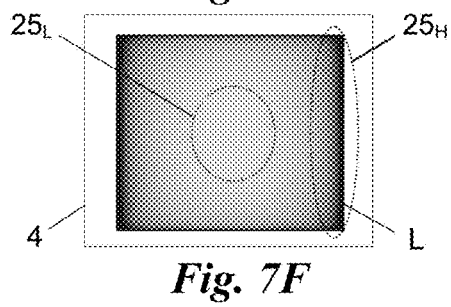
FIG. 7F the distribution of the pixel resolution over the image plane as a result of the finalised Lissajous trajectory of FIGS. 7A-7D, wherein dark grey represents a high pixel resolution and light grey represents a low pixel resolution.

In the example shown in FIG. 7F dark grey represents a high local pixel resolution $R_{xy}$ of, e.g., 4000 pixels per square inch (4000 DPI) in an exemplary region $25_H$ at the periphery of the image plane 4, and light grey represents a low pixel resolution $R_{xy}$ of, e.g., 1000 pixels per square inch (1000 DPI) in an exemplary region $25_L$ in the middle of the image plane 4.

Figure 8F:
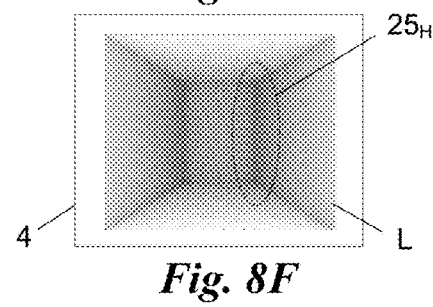
FIG. 8F the distribution of the pixel resolution over the image plane as a result of the finalised Lissajous trajectory of FIGS. 8A-8D, wherein dark grey represents a high pixel resolution and light grey represents a low pixel resolution.

By varying the amplitude of the oscillations of the mirror 17 about the two axes 19, 20 and hence the current maximum size of the trajectory L while it is drawn to "build-up" a frame, as it is shown in FIGS. 8A-8D, the local "density" of the finalised trajectory L on the image plane 4 (FIG. 8F) can be altered in such a way that areas $25_H$ in the image plane 4 with a high pixel resolution $R_{xy}$ (FIG. 7F) will occur at different locations in the image plane 4, see FIG. 8F.

The amplitude of oscillations of the mirror 17 about the axes 19, 20 can be altered in different ways, for example, by changing the amplitude of the excitation signals $S_1$, $S_2$; by moving the frequencies $f_1$, $f_2$ of the excitation signals $S_1$, $S_2$ further away from the respective resonance frequency of the mirror 17 about the respective axis 19, 20, which leads to a drop of the oscillation amplitude from its maximum at resonance; by reducing the pulsewidth of a pulsed excitation signal $S_1$, $S_2$; etc. In general, the amplitude of the mirror oscillation about any of the two axes 19, 20 can be varied by amplitude modulation, frequency modulation, pulsewidth modulation or phase modulation of the respective excitation signal $S_1$, $S_2$ with a respective modulation signal $M_1$, $M_2$ generated by the controller 15.

Figure 9:
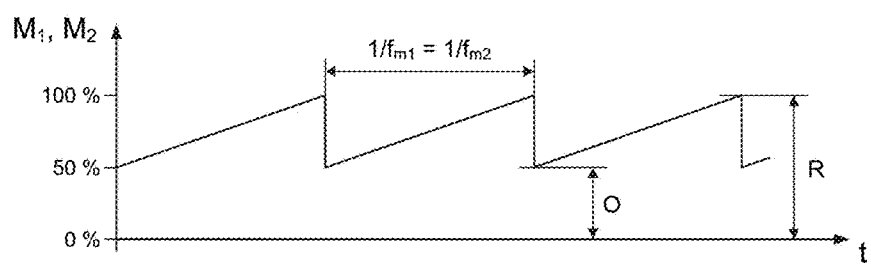
FIG. 9 an exemplary modulation signal for one or both of the excitation signals.

FIG. 9 shows an example of first and second modulation signals $M_1$, $M_2$ to be used to amplitude-modulate the first and second excitation signals $S_1$, $S_2$ of FIGS. 6A and 6B in form of a saw-tooth signal with a frequency $f_{m1}$, $f_{m2}$ equal to the one- or morefold of the frame rate $f_{fr}$ and an offset O of about 50% of the entire amplitude modulation range R of 100%.

For achieving a high pixel resolution $R_{xy}$, the graphics controller 15 will not only generate the modulation signals $M_1$, $M_2$ to achieve the higher density of the trajectory L in the areas $25_H$, i.e., the higher number of passes $P_1$-$P_5$ of the light beam 12 per unit area U and per frame period $T_{fr}$ in these areas $25_H$ as shown in FIGS. 8f and 14b, but concomitantly order the image processor 14a to read-out a correspondingly increased number of pixels 3 (in the example of FIG. 14B: the pixels $3_1$-$3_5$) from the image buffer 14b so that the number of pixels 3 per unit area U and per frame period $T_{fr}$ is higher in the area $25_H$. Generally speaking, in said latter variant the number of pixels 3 per unit area U and per frame period $T_{fr}$ read-out from the buffer 14b by the image processor 14a (the "pixel read-out ratio") corresponds to the local density of the trajectory L, i.e., to the number of geometrically different passes NP of the light beam 12 per frame period $T_{fr}$ and per local unit area U at the respective location xy within the image plane 4, in order to achieve the respective local pixel resolution $R_{xy}$.

Therefore, for a specific area $25_H$ of high pixel resolution $R_{xy}$ to achieve, the graphics controller 15 may calculate—in addition to specific modulation signals $M_1$, $M_2$ for the excitation signals $S_1$, $S_2$—a respective control signal $CS_{xy}$ to control the pixel read-out ratio of the image processor 14a. The control signal $CS_{xy}$ indicates the number of pixels 3 the image processor 14a reads out from the image buffer 14b per local unit area U of the image plane 4 and per frame period $T_{fr}$. This is shown in detail in FIGS. 14C and 14D.

As shown in FIG. 14C, an image frame 2 may be input into and stored in the image buffer 14b in its highest resolution available, e.g., in a regular 4K resolution all over the image. The control signals $CS_{xy}$ indicates a ratio of local "subsampling" of pixels per unit area U and per frame period $T_{fr}$ when reading the intensity and/or colour values of the pixels 3 out from the buffer 14b and outputting them to the input 13 of the light source 11. For example, in a region $25_H$ of high pixel resolution $R_{xy}$ the control signal $CS_{xy}$ orders no subsampling (pixel read-out ratio is 1:1), whereas in a region $25_H$ outside of the region $25_H$ the control signal $CS_{xy}$ orders subsampling. When subsampling in the region $25_L$, e.g., from any local group of 2×2, 4×4, 8×8, 16×16 etc. pixels 3, only one pixel 3 is read-out by the image processor 14a from the image buffer 14b and applied to the light source 11. This subsampling may optionally involve an averaging so that the pixel read-out ("picked") by the image processor 14a from a local group of pixels 3 is a weighted or unweighted average value of the (colour and/or intensity values of the) pixels 3 of that group and/or one or more neighbouring groups. FIG. 12D shows an example of a pixel read-out ratio (subsampling) of 16:1 in the region $25_L$ outside of the region $25_H$.

Figure 2B:
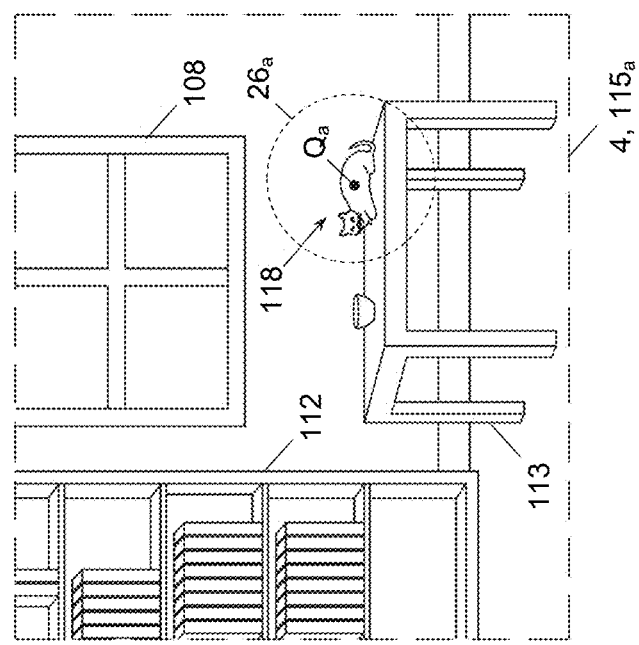

The above-mentioned modulation of the excitation signals $S_1$, $S_2$ by the modulation signals $M_1$, $M_2$ is now selectively used in the display apparatus 1 to increase the local per-pixel refresh rate $RR_{xy}$ and/or the local pixel resolution $R_{xy}$ in a region of scene, ROS, 26 (FIGS. 2A, 2B) which contains the virtual scene 118 at the location Q in the image plane 4, i.e., to shift the region $25_H$ of increased per-pixel refresh rate $RR_{xy}$ and/or increased pixel resolution to where the virtual scene 118 (here: the virtual cat) shall be displayed in the image plane 4, (here: at the displaying locations $Q_a$, $Q_b$ in FIGS. 2A and 2B).

The ROS 26 is determined by the graphics controller 15 when calculating the image data ID from the scene data SD in such a way that any movements of the user 101, in particular of the position $P_1$ and the pointing direction D of his/her head 117 with the display apparatus 1, are compensated, so that the virtual scene 118 seems to remain stationary at the selected position $P_2$ in the environment 102. To this end, the graphics controller 15 has a first calculation part 15*a* which receives the scene data SD at the input IN. At a second input TR the calculation part 15*a* of the graphics controller 15 receives the output of a head tracker 28 which detects and tracks the (usually varying) head position $P_1$ and head pointing direction D of the user 101 in the environment 102, as referenced to the coordinate system 103.

The head tracker 28 can be implemented in any form, e.g., as a camera mounted stationarily in the environment 102 at a known location with an known field of view, e.g., a 2D or 3D camera. Or, the head tracker 28 could be a transceiver or receiver mounted stationarily in the environment 102 which detects and analyses any sort of radiation reflected from the user's head 117 or the display apparatus 1 worn thereon, such as radio waves when the head tracker 28 is a RADAR, or visible or infrared light rays when the head tracker 28 is a LIDAR or a laser scanner, etc. A head tracker 28 mounted in the environment could also be a set of distributed receivers or transceivers which triangulate the head position $P_1$ and direction D from various perspectives in the environment 102. Triangulation of the user's head 117 and/or the display apparatus 1 mounted thereon could also be assisted by reflective targets, transponders or the like worn by the user 101 or mounted on the display apparatus 1.

In another embodiment the head tracker 28 could be mounted on the user's head 117 or the display apparatus 1, e.g., in the form of a miniature 2D or 3D camera 29*a* mounted on the AR glasses as shown in FIG. 3, and determine the position $P_1$ and pointing direction D of the user's head 117 with the display apparatus 1 in the environment 102. For example, the graphics controller 15 can be provided with a database 29*b* storing a 3D model of the environment 102 (or at least of some of the objects 104-114 therein) referenced to the coordinate system 103, and the calculation part 15*a* can be configured to detect the environment 102 (or at least some of the objects 104-114), and therein the head position $P_1$ and pointing direction D from the output of the camera 29*a*. In particular, the camera 29*a* may be a 3D camera with known camera parameters which captures a 3D segment of the environment 102, and the calculation part 15*a* determines the head position $P_1$ and head pointing direction D from a comparison of the captured 3D segment with the 3D model stored in the database 29*b* on the basis of the camera parameters.

The 3D model in the database 29*b* may be pre-stored or generated by the camera 29*a* itself in a preceding calibration step, for example by letting the user 101 look around from a reference position while recording the looking movement, to record the 3D model of the environment 102.

In still a further embodiment the head tracker 28 could locate itself in the environment 102 by analysing wireless signals received from known locations in the environment 102, e.g., radio, visible light or infrared signals. For example, the head tracker 28 can have a receiver 29*c* for GNSS signals, assisted by acceleration measurements from an accelerometer (inertial measurement unit, IMU) 29*d* for improving the GNSS based positioning results in accuracy by dead reckoning. Instead of GNSS signals the receiver 29*c* could also receive triangulation signals from dedicated radio beacons distributed in the environment 102 to determine its position $P_1$ and, by directional sensitivity, the direction D. If the positional accuracy of such a dedicated beacon system is sufficient, assistance by an accelerometer 29*d* will not be necessary.

The graphics controller 15, in particular its calculation part 15*a*, uses the current head position $P_1$ and head pointing direction D—which will usually vary over time—to shift the virtual scene 118 in the image plane 4, which overlays the light field 9 from the environment 102, to the current display location Q in the image plane 4 so that the virtual scene 118 remains stationary irrespective of the movement of the user's head 117. To this end, the graphics controller 15 optionally uses the 3D model in the database 29*b* to adapt the virtual scene 118 to any real-world objects 104-114 in the environment 102 for a realistic experience (here: the virtual cat sitting on the real-world table 113).

Having calculated the current image data ID with the virtual scene 118 at the correct location Q in the image plane 4, the graphics controller 15 is concurrently aware of the ROS 26 in the image plane 4, i.e. that region in which the virtual scene 118 is currently displayed.

Information about the ROS 26, for example about its center Q or one or more of its coordinates, its shape, size etc., is communicated from the calculation part 15*a* of the graphics controller 15 to its modulation part 15*b* which generates the modulation signals $M_1$ and $M_2$ in dependence of the ROS 26 as follows.

In particular, the information about the location, size, shape etc. of the ROS 26 in the image plane 4 is used by the modulation part 15*b* to move the region $25_H$ of increased per-pixel refresh rate $RR_{xy}$ and/or increased pixel resolution $R_{xy}$, as achieved by the modulation of the excitation signals $S_1$, $S_2$ with the modulation signals $M_1$, $M_2$ (and the current pixel readout ratio, if necessary), into or over the ROS 26. This is shown in detail in FIGS. 10A, 10B and 14D for two different ROS 26*a* and 26*b* corresponding to two ROS locations $Q_a$ and $Q_b$ as in the example of FIGS. 2A and 2B.

The graphics controller 15 is configured to calculate or choose the appropriate modulation signal/s $M_1$, $M_2$ in dependency on the ROS 26 so that the region $25_H$ of increased per-pixel refresh rate $RR_{xy}$ and/or increased pixel resolution $R_{xy}$ falls into or covers the ROS 26 as good as possible. For increased pixel resolution $R_{xy}$ the image processor 14*a* is also configured to calculate or choose the appropriate pixel read-out ratio for the buffer 14*b* according to the control signal $CS_{xy}$ received from the modulation part 15*b* of the graphics controller 15.

As can be seen from FIGS. 10A and 10B, the region $25_H$ of increased per-pixel refresh rate $RR_{xy}$ and/or increased pixel resolution $R_{xy}$ may be symmetrical about two axes of the image plane 4, i.e., look like a "painting canvas frame" the size and width of which depend on the excitation and modulation signals $S_1$, $S_2$, $M_1$, $M_2$ used. The region $25_H$ may thus be significantly greater than the ROS 26, here: the respective ROS 26*a* and 26*b*.

Parts of the head tracker 28, in particular its processing components, may be implemented by the graphics controller 15 and/or the image processor 14*a*. In general, the graphics controller 15, the image processor 14*a*, the image buffer 14*b* and the head tracker 28 may be implemented individually by separate electronic components or integrated into each other as needed, i.e., share common electronic components.

The modulation signals $M_1$, $M_2$ and control signals $CS_{xy}$ required to achieve a specific region $25_H$ of increased per-pixel refresh rate $RR_{xy}$ and/or increased pixel resolution $R_{xy}$ that hits or covers the ROS 26, i.e., the dependencies of the signals $M_1$, $M_2$, $CS_{xy}$ on the ROS 26, can be programmed into the modulation part 15b of the graphics controller 15 in form of a formula. Alternatively, as shown in FIG. 5, the graphics controller 15 has a memory 30 which stores a look-up table 31 for the dependencies (associations) between different possible ROS 26—e.g., grouped according to regions $25_H$ into which they fall—and respective first and second modulation signals $M_1$, $M_2$.

FIG. 11 shows an example of such a look-up table 31 in the memory 30 of the graphics controller 15 in form of two matrices 32, 33, one matrix 32 for a set of different regions $25_H$ of increased per-pixel refresh rate $RR_{xy}$ and/or increased pixel resolution $R_{xy}$ which each cover a set of possible ROS 26 and another matrix 33 for a set of different pairs of first and second modulation signals $M_1$, $M_2$. Each modulation signal $M_1$, $M_2$ is identified by the shape of the modulation signal within one period $1/f_{m1}$, $1/f_{m2}$ of the modulation signal, to be repeated over time t. Each pair of modulation signals $M_1$, $M_2$, i.e., each element of the matrix 33, corresponds to one region $25_H$ of increased per-pixel refresh rate $RR_{xy}$ and/or increased pixel resolution $R_{xy}$ achievable with that pair of modulation signals $M_1$, $M_2$, i.e., to one respective element of the matrix 32.

For a specific ROS 26 determined by the calculation part 15a, the modulation part 15b looks up the region $25_H$ into which the ROS 26 falls (or which falls into that ROI 26) and retrieves from the correspondence between the elements of the matrices 32, 33 the corresponding first and second modulation signals $M_1$, $M_2$. The graphics controller 15 then modulates the excitation signals $S_1$, $S_2$ with the modulation signals $M_1$, $M_2$ retrieved from the look-up table 31. For increased pixel resolution $RR_{xy}$, the graphics controller 15 also controls the image processor 14a such that the number of pixels 3 read-out per unit area U by the image processor 14a is correspondingly higher in the ROS 26 than in a region $25_L$ outside of the ROS 26.

The corresponding control signal $CS_{xy}$ can instruct the image processor 14a to perform the reduced subsampling or non-subsampling in the entire region $25_H$ or only in the ROS 26. The control signal $CS_{xy}$ may, e.g., be a first predefined pixel read-out ratio for the region $25_H$ or ROS 26 and a second predefined pixel read-out ratio for the region $25_L$. When generated by the graphics controller 15, each corresponding control signal $CS_{xy}$ may be stored in the look-up table 31 together with the respective modulation signals $M_1$, $M_2$.

To perform the modulation, the display apparatus 1 may have discrete modulators 34, 35 receiving the excitation signals $S_1$, $S_2$ from the signal generators 23, 24 on the one hand and the modulation signals $M_1$, $M_2$ from the graphics controller 15 on the other hand. Alternatively, the signal generators 23, 24 and modulators 34, 35 can be implemented by processing elements within the graphics controller 15.

In general, different types of modulation signals $M_1$, $M_2$, can be used which lead to different shapes and sizes of regions $25_H$ of increased per-pixel refresh rate $RR_{xy}$ and/or increased pixel resolution $R_{xy}$. Instead of the saw-tooth signals of FIG. 9, triangular signals with an offset could be used as modulation signals $M_1$, $M_2$, wherein the slopes of the triangles and the offset depend on the ROS 26 to be hit or covered by the region $25_H$. FIGS. 12A-12E show further examples of useful modulations signals $M_1$, $M_2$ which lead to the different distributions of the per-pixel refresh rate $RR_{xy}$ or pixel resolution $R_{xy}$, respectively, over the image plane 4 shown in FIGS. 13A-13E.

Figure 12A:
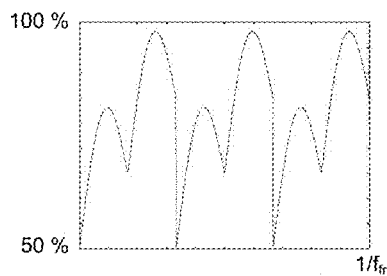
FIGS. 12A-12E five further exemplary embodiments of modulation signals for the excitation signals.
Figure 13A:
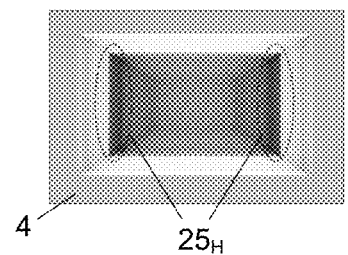
FIGS. 13A-13E respective five distributions of the per-pixel refresh rate or pixel resolution, respectively, over the image plane resulting from an amplitude-modulation of sinusoidal excitation signals with the modulation signals of FIGS. 12A-12E, respectively.
Figure 12B:
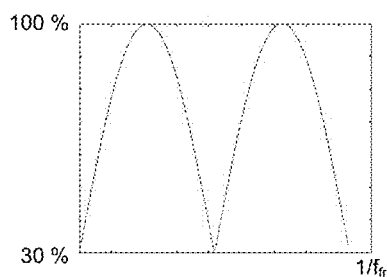
Figure 13B:
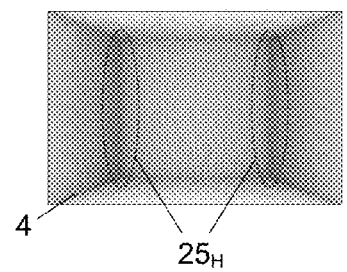

In FIG. 12A, the modulation signal $M_1$ or $M_2$ is a sequence of different sine halves per frame rate period $1/f_{fr}$, with an offset of 50%. In FIG. 12B, the modulation signal $M_1$ or $M_2$ is a sequence of two similar sine halves with an offset of 30%.

Figure 12C:
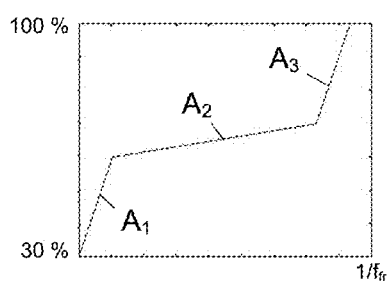
Figure 13C:
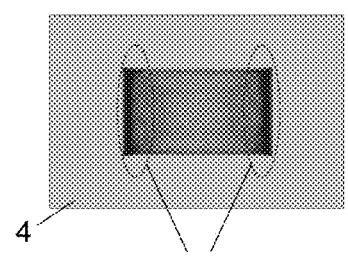
Figure 12D:
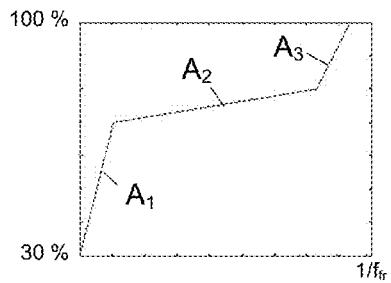
Figure 13D:
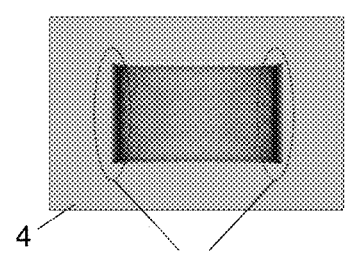
Figure 12E:
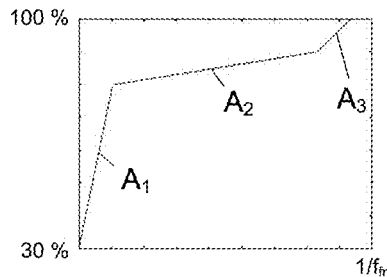
Figure 13E:
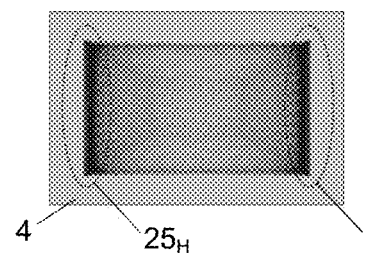

In FIGS. 12C-12E the modulation signal $M_1$ or $M_2$ is a step-like function comprised of a first section $A_1$ with high slope, a middle section $A_2$ with low slope, and a last section $A_3$ with high slope, and an offset of 30%. The respective slopes and lengths of the sections $A_1$, $A_2$, $A_3$ and the offset O each depend on the ROS 26 to cover with the region $25_H$ of increased per-pixel refresh rate $RR_{xy}$ and/or increased pixel resolution $R_{xy}$ achieved with this sort of modulation.

In an optional variant (not shown), the modulation signal $M_1$ or $M_2$ is a repetition of a step function comprised of at least two sections of different respective constant values, wherein the respective values and lengths of the sections depend on the ROS 26. It goes with saying that each of the excitations signals $S_1$, $S_2$ can be modulated with the same or different modulation signals $M_1$, $M_2$, i.e., with modulation signals $M_1$, $M_2$ of different frequencies, shapes, amplitudes and offsets.

The region $25_H$ of increased per-pixel refresh rate and/or pixel resolution, or the ROS 26, respectively, may be perceived by the user 101 with an increased light intensity. This is not only caused by the increased refresh rate or resolution itself but also by the varying local speed of the light beam 12 along its Lissajous trajectory L, as the light beam 12 moves slower in the periphery and faster in the middle of the image plane 4. The perceived intensity in a pixel 3 may thus depend on the total (i.e., summed) amount of time the light beam 12 spends in that pixel 3 during the time an image frame 2 is displayed. This may be a desirable effect if the attention of the user shall be particularly drawn to the region $25_H$ or the ROS 26, respectively. On the other hand, if this is an undesirable effect which shall be countered, the graphics controller 15 can optionally decrease the intensity of the light beam 12 via the control input 13 of the light source 11 for a pixel 3 when the amount of time the light beam 12 spends in that pixel 3 during a image frame 2 increases, and vice versa. In general, the graphics controller 15 can decrease the intensity of the light beam 12 via the control input 13 of the light source 11 for pixels 3 within the region $25_H$, or at least within the ROS 26, and increase it outside thereof.

In a further optional variant multiple different regions $25_{H,i}$ (i=1, 2, . . . ) with respective different per-pixel refresh rates $RR_{xy}$ and/or respective different refresh rates $R_{xy}$ (with respective different subsampling ratios) may be used. This can be done, e.g., to "smooth" the transition of the per-pixel refresh rate and/or pixel resolution between the ROS 26 and its surrounding, or between the areas $25_H$ and $25_L$, respectively, by using one or several adjacent "intermediate" regions $25_{H,i}$ of gradually decreasing per-pixel refresh rate $RR_{xy}$ and/or pixel resolution $R_{xy}$ until the per-pixel refresh rate and/or pixel resolution has reached that of the neighbouring region $25_L$.

The disclosed subject matter is not restricted to the specific embodiments described herein, but encompasses all variants, modifications and combinations thereof that fall within the scope of the appended claims.

What is claimed is:

1. An apparatus for displaying a virtual scene at a selected position in an environment to a user who has a varying head position and head pointing direction in the environment, comprising:
   a display wearable on the head in front of an eye and configured to display and concurrently combine an image on an image plane with light from the environment;
   a head tracker configured to detect the varying head position and head pointing direction in the environment; and
   a graphics controller connected to the head tracker and the display and having an input for scene data representing the virtual scene at the selected position, the graphics controller being configured to calculate, from the scene data, image data for the display such that the virtual scene is displayed to the eye at the selected position in the environment irrespective of the varying head position and head pointing direction;
   wherein the image data is a succession of image frames to be displayed on the image plane with a frame rate, each image frame being composed of pixels and being displayed for a frame period, and the virtual scene appearing in each image frame in a region of scene, ROS;
   wherein the display includes a mirror assembly connected to the graphics controller, a first mirror of the mirror assembly being configured to oscillate about a first axis upon excitation by a first excitation signal of a first frequency and the first or a second mirror of the mirror assembly being configured to oscillate about a second axis upon excitation by a second excitation signal of a second frequency;
   wherein the display further includes a light source configured to project a light beam onto the mirror assembly for deflection by the mirror assembly towards the image plane, each pixel in the image plane being hit by the light beam with a per-pixel refresh rate, the light source having an input via which it can be controlled according to the pixels of the image data, the image data being fed from the graphics controller to the display via a buffer and an image processor which selectively reads-out the pixels from the buffer and then sequentially applies them to the input of the light source; and
   wherein the graphics controller is configured to modulate one of the first and second excitation signals by a first modulation signal which is dependent on the ROS.

2. The apparatus according to claim 1, wherein the dependency of the first modulation signal on the ROS is such that the per-pixel refresh rate is higher in the ROS than in a region outside of the ROS.

3. The apparatus according to claim 2, wherein the graphics controller is configured such that said per-pixel refresh rate is, in an intermediate region between the ROS and said region outside of the ROS, lower than in the ROS and higher than in said region outside.

4. The apparatus according to claim 1, wherein the dependency of the first modulation signal on the ROS is such that a number of passes of the light beam per unit area of the image plane and per frame period is higher in the ROS than in a region outside of the ROS,
   wherein the image processor is configured to control the number of pixels read-out per unit area and per frame period such that said number of pixels is higher in the ROS than in a region outside of the ROS.

5. The apparatus according to claim 4, wherein the graphics controller is configured such that said number of passes is, in an intermediate region between the ROS and said region outside of the ROS, lower than in the ROS and higher than in said region outside, and in that the image processor is configured such that said number of pixels read-out is, in said intermediate region, lower than in the ROS and higher than in said region outside.

6. The apparatus according to claim 4, wherein the image processor is configured to receive a control signal from the graphics controller, wherein said control signal indicates a pixel read-out ratio to be used by the image processor when reading-out the pixels.

7. The apparatus according to claim 1, wherein the head tracker is mounted on the display and has a camera for capturing a 3D segment of the environment from a current head position and in a current head pointing direction,
   wherein the graphics controller has a memory containing a 3D model of the environment and is configured to detect the current head position and current head pointing direction from a comparison of the 3D segment with the 3D model.

8. The apparatus according to claim 1, wherein the head tracker is mounted on the display and has a receiver for radio signals from known locations in the environment as well as an accelerometer for dead reckoning,
   wherein the graphics controller is configured to detect a current head position and a current head pointing direction by means of the receiver and the accelerometer.

9. The apparatus according to claim 1, wherein the graphics controller is configured to decrease the intensity of the light beam for a pixel in the ROS when an amount of time the light beam spends in that pixel during an image frame increases, and vice versa.

10. The apparatus according to claim 1, wherein the graphics controller is configured to modulate the other one of the first and second excitation signals by a second modulation signal which is dependent on the ROS in each image frame.

11. The apparatus according to claim 10, wherein at least one of the frequency of the first modulation signal and the frequency of the second modulation signal is a one- or morefold of the frame rate.

12. The apparatus according to claim 10, wherein the graphics controller is configured to amplitude-modulate the first excitation signal by the first modulation signal and to amplitude-modulate the second excitation signal by the second modulation signal.

13. The apparatus according to claim 10, wherein the graphics controller has a memory with a look-up table which stores, for each one of a set of different possible ROS within the image plane, respective first and second modulation signals dependent on that ROS, wherein the graphics controller is configured to retrieve the first and second modulation signals dependent on the ROS from the look-up table.

14. The apparatus according to claim 10, wherein at least one of the first and second modulation signals is a triangular or saw-tooth signal with an offset, wherein the slopes of the saw-teeth or triangles and the offset depend on the ROS, or
   wherein at least one of the first and second modulation signals is a sequence of sine halves with an offset, wherein the amplitudes of the sine halves and the offset depend on the ROS.

15. The apparatus according to claim 10, wherein at least one of the first and second modulation signals is a repetition of a step-like function comprised of a first and a last section with high slope, a middle section with low slope, and an offset, wherein the respective slopes and lengths of the sections and the offset depend on the ROS, or wherein at least one of the first and second modulation signals is a repetition of a step function comprised of at least two sections of different respective constant values, wherein the respective values and lengths of the sections depend on the ROS.

* * * * *